Dec. 14, 1926.
C. C. BRINTON
1,610,487
BALANCING CLAMP
Filed July 14, 1923   2 Sheets-Sheet 1
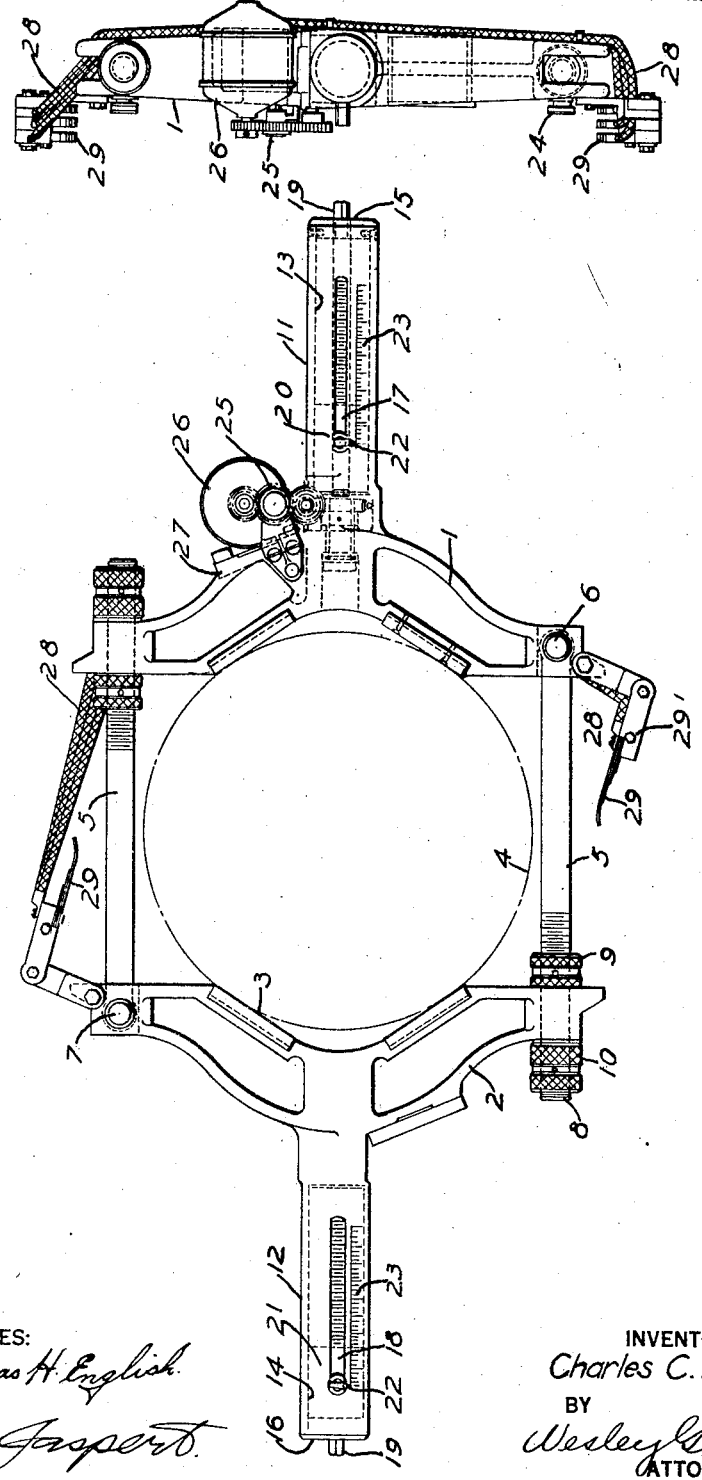
WITNESSES:
Thomas H. English
W. B. Jaspert
INVENTOR
Charles C. Brinton.
BY
Wesley G. Carr
ATTORNEY Dec. 14, 1926.
C. C. BRINTON
1,610,487
BALANCING CLAMP
Filed July 14, 1923  2 Sheets-Sheet 2
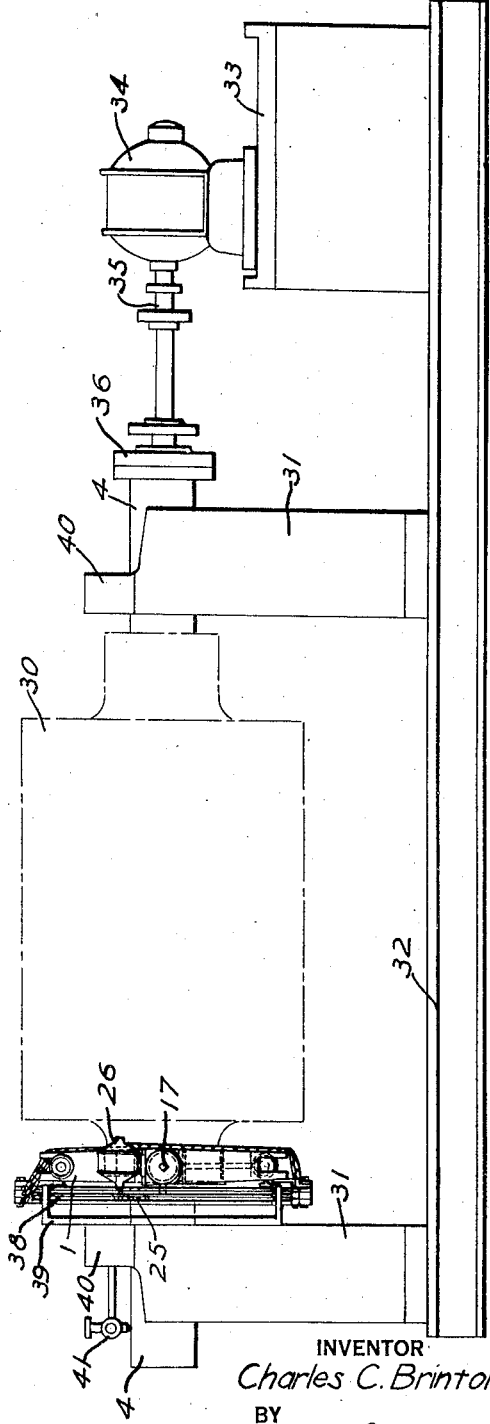
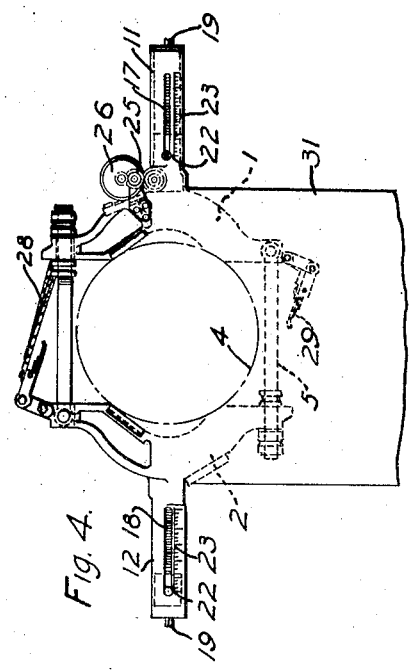
WITNESSES:
Thomas H. English.
W. B. Jaspert.
INVENTOR
Charles C. Brinton.
BY
Wesley Clearr
ATTORNEY Patented Dec. 14, 1926.

1,610,487

UNITED STATES PATENT OFFICE.

CHARLES C. BRINTON, OF EDGEWOOD, PENNSYLVANIA, ASSIGNOR TO WESTINGHOUSE ELECTRIC & MANUFACTURING COMPANY, A CORPORATION OF PENNSYLVANIA.

BALANCING CLAMP.

Application filed July 14, 1923. Serial No. 651,471.

My invention relates to balancing devices, more especially to an apparatus which is adapted to determine the quantity of unbalanced mass in rotating bodies, such as the rotors or armatures of dynamo electric machines.

It is among the objects of this invention to provide a balancing device of simple, compact structure which may be readily and conveniently mounted on the shaft of a large rotor, which shall be capable of determining within practical limits the amount of unbalance in such rotor while subjected to angular motion and which shall be adapted to automatically adjust its counter-balancing mechanism to offset the unbalanced mass of the body being tested to bring the same into dynamic balance.

In the balancing of large rotors, it is necessary for the purpose of convenience and the saving of time and labor to utilize a balancing device which is adjustable for the purpose of determining the amount of unbalance in the rotor or body being tested. One form of adjusting mechanism consists of a clamp member of the same general construction and design as a turnbuckle adapted to be secured to the shaft of a rotatable body by a plurality of set screws which may be adjusted to shift the center of gravity of the body or frame portion of the clamp relative to the axis of rotation to counter-balance the dynamic unbalanced mass of the rotor for determining the relative amount thereof to be removed or added, as required.

My present invention is directed to a balancing device of this general type comprising a clamping frame having a pair of oppositely disposed radial arms which carry adjustable weights, one of which is adapted to automatically adjust itself while the body being tested is subjected to angular motion. The adjustable weights are further adapted to indicate their respective locations on the radial arms which determines the radius of displacement from which the correction weight to offset the unbalance of the rotor is calculated.

In the accompanying drawing constituting a part hereof and in which like reference characters designate like parts:

Figure 1 is a front elevational view of a counter-balancing device mounted on the end of a rotor shaft and embodying the principles of my invention, Fig. 2 is a side elevational view thereof, Fig. 3 is a side elevational view of a rotor journaled in suitable bearing supports and having a motor for rotating the same and showing the relative position of the counter-balancing device when mounted for testing unbalance in the rotatable body, and Fig. 4 is an end elevational view of the mechanism illustrated in Fig. 3.

As illustrated in Fig. 1, the counter-balancing device comprises a pair of clamping frame portions 1 and 2 provided with bearing pads 3 adapted to engage a member of circular contour such as the shaft 4 of a rotor or the like. The members 1 and 2 are joined by a pair of hinged bolts 5 which are pivotally mounted at the joints 6 and 7, respectively. The bolts 5 are provided with threaded end portions 8 adapted to receive a plurality of ring nuts 9 and 10 to properly adjust the space of the frame portions 1 and 2 in accordance with the diameter of the shaft upon which they are mounted. A pair of oppositely disposed radially extending arms 11 and 12 are formed integrally with the members 1 and 2, respectively. The arms 11 and 12 are provided with openings 13 and 14 and end caps 15 and 16, respectively.

Screw threaded shafts 17 and 18 are journaled in the arms 11 and 12, respectively, and are provided with square end portions 19 adapted to receive an end wrench or crank. Weights 20 and 21 are mounted in the arms 11 and 12 and are provided with indicators 22 adapted to co-operate with graduations 23 on the arms to indicate the positions of the respective weights. The weights 20 and 21 are further provided with threaded portions engaging the screws 17 and 18 so that when the latter rotate, the weights move radially relatively to the center of the shaft 4. The screw threaded shaft 17 is connected through a train of gears 25 to a motor 26 mounted on a pad 27 secured to the clamping frame 1, the motor being connected through a plurality of terminal leads 28 to a pair of brushes 29 which are adapted to engage a plurality of collector rings 38 mounted on the frame portion of the journal supports in which the motor 4 is mounted.

Referring to Fig. 3, the counter-balancing device is utilized in the following manner. A rotor 30, such as an armature for a dynamo-electric machine, having extending shaft portions 4 is journaled in a plurality of vertical pedestal blocks 31 secured to a bed or base 32 having an elevated frame portion 33 on which a motor 34 is mounted. The motor 34 is secured with its shaft 35 in alinement with the shaft 4 of the rotor 30 to which it is coupled, preferably by a flexible coupling 36. The counter-balancing device is mounted on a shoulder of the rotor 30 in alinement with a plurality of collector rings 38 which are secured by a mounting bracket 39 to a journal pedestal 31. The rings 38 are connected to a suitable source of electrical energy (not shown). The journal portions of the pedestals 31 are provided with spring mounted bearings, one of which has a dial indicating device associated therewith to indicate the degree of vibration caused by the centrifugal force exerted by the unbalanced mass of the rotating member 30.

The operation of this device is briefly as follows: Assuming that the rotor 30 is in a state of unbalance and that the journal in pedestal 31 is supported by the spring mounted bearing 40 so that if the rotor be rotated at a speed that corresponds to the natural period of vibration of the supporting springs, the rotor will oscillate due to the unbalanced mass and this oscillation will be greatly accentuated. A marker is held against the shaft when it is oscillating at the critical period and a mark is produced thereon. The point of unbalance will be 90° away in a direction opposite to that of the rotation from the center of the mark. The counter-balancing mechanism is located on the shaft 4 with the arm 11 carrying the motor actuated adjustable weight 20 at the point of unbalance.

The motor 34 is then energized to actuate the rotor 30 causing it to attain a definite angular velocity and the motor 26 is simultaneously energized to cause the screw shaft 17 to be actuated through the gear train 25 and motor 26. The dial indicator 41 indicates a degree of vibration in the pedestal members 40 set up by the centrifugal force of the unbalanced mass in the rotor 30 and this vibration gradually decreases until the adjusting weight 20 has reached such position on the screw member 17 as to bring the principal axis of inertia in coincidence with the axis of rotation of the rotor 30.

When this is achieved, the dial indicator 41 will indicate a minimum vibration and the motor 26 is de-energized to fix the position of the counter-balancing weight 20. The rotor 30 is then brought to a standstill and the operator reads the position of the weight 20 by the location of its indicator 22 on the graduations 23 of the arm 11. This is noted and the counter-balancing mechanism may then be shifted in an angular direction on either side and the procedure of balancing is then repeated to determine the exact location of the correction weight which will be at the point of maximum unbalance as indicated by the weight 20.

The counter-balancing mechanism is adapted to be adjusted for various sizes of rotor shafts and the weight 21 on the arm 12 is manually adjustable to obtain an initial balance of the frame portions in various positions depending upon the sizes of the rotor shafts.

The weights 20 and 21 may be locked in position by the thumb screws 24. The brush holders 29' of the brushes 29 are likewise adjustable to various positions on the collector rings 38 which vary with the adjustment of the clamping frame portions 1 and 2.

It is evident from the above description of my invention that a balancing device made in accordance therewith provides a simple and efficient means for determining the amount of unbalance in rotors and the like in an expedient and inexpensive manner. The automatic adjustment of the counter balancing weight obviates the cut and trial methods previously necessary for determining the quantity of the unbalanced mass and the compact construction of the device permits of simplicity in handling, which greatly reduces the time required for conducting such tests.

Although I have described a specific embodiment of my invention, it will be obvious to those skilled in the art that various modifications may be made in the details of construction without departing from the principles herein set forth.

I claim as my invention:

1. A counterbalancing device comprising a clamping frame having a plurality of radial arms thereon, movable weights in said arms and power operated means for adjusting one of said weights relative to the center of gravity of said frame.

2. A counterbalancing device comprising a clamping frame having a plurality of radial arms thereon, movable weights in said arms, motor-operated means for adjusting said weights relative to the center of gravity of said frame and indicating means for determining the relative positions of said weights.

3. A counterbalancing device comprising a clamping frame having a plurality of hollow radial arms thereon, movable weights within said arms, and means for adjusting one of said weights while said device is in angular motion.

4. A counterbalancing device comprising a clamping frame having a plurality of radial arms thereon, movable weights in said arms and means for adjusting one of said weights comprising a motor-actuated screw shaft journaled in one of said arms and operatively connected to said weight.

5. A counterbalancing device comprising a clamping frame having a plurality of radial arms thereon, screw shafts journaled in said arms, movable weights operatively engaging said shafts and means for actuating one of said screw shafts to effect radial movement of its cooperative weight along its supporting arm.

6. A counterbalancing device comprising a clamping frame having a plurality of radial arms thereon, screw shafts journalled in said arms, movable weights operatively engaging said shafts, a motor mounted on said frame and means for operatively engaging said motor and one of said screw shafts.

7. A counterbalancing device comprising a clamping frame having radial arms thereon, screw shafts journalled in said arms, adjusting weights associated with said shafts, a motor secured to said frame, a plurality of gear wheels connecting said motor and one of said shafts, and graduations on said arms adapted to indicate the relative position of said weights.

8. A counterbalancing device comprising a clamping frame having radially oppositely extending arms thereon, screw shafts journalled in said arms, adjusting weights having indicators thereon operatively engaged with said shafts, a motor secured to said frame, a plurality of gear wheels connecting said motor and one of said shafts, and graduations on said arms in alignment with said weight indicators for determining the relative position of said weights.

9. A counterbalancing device comprising a clamping frame adapted to be secured to a rotor shaft, a plurality of oppositely-disposed radially-extending hollow arms on said frame, a plurality of counterbalancing weights adapted to move longitudinally within said arms and means for adjusting one of said weights to counteract the unbalanced mass in the rotor.

10. A counterbalancing device comprising a clamping frame adapted to be secured to a rotor shaft and means associated therewith for counterbalancing the unbalanced mass in the rotor while the latter is subjected to angular motion, said means comprising a motor-driven screw-actuated adjusting weight.

11. A counterbalancing device comprising a clamping frame adjustable for different sizes of rotor shafts, a plurality of radially movable counterbalancing weights mounted thereon, a motor secured to said frame to actuate one of said weights and indicating means for determining the relative position thereof.

12. A counterbalancing device comprising a clamping frame adjustable for different sizes of rotor shafts, a plurality of radially movable counterbalancing weights mounted thereon, means for balancing said clamp on a rotor and means associated with one of said weights for determining the degree of unbalance of said rotor, a motor secured to said frame to actuate one of said weights, and indicating means for determining the relative position thereof.

In testimony whereof, I have hereunto subscribed my name this 11th day of July, 1923.

CHARLES C. BRINTON.